United States Patent Office 2,790,737
Patented Apr. 30, 1957

2,790,737

SOIL RETARDANT FABRIC AND COMPOSITION AND PROCESS FOR PRODUCING THE SAME

Roy H. Kienle, Bound Brook, and Elliot S. Pierce, Plainfield, N. J., and Pauline Newman, New York, N. Y., assignors to American Cyanamid Company, New York, N. Y., a corporation of Maine No Drawing. Application April 1, 1954,
Serial No. 420,460

13 Claims. (Cl. 117—161)

This invention relates to a novel composition of matter comprising titania monohydrate having a particle size less than about 0.1 micron and a polymer of a compound containing a polymerizable $CH_2=C<$ group, wherein said polymer is produced by emulsion polymerization and has been washed substantially free of emulsifying agent. The invention further relates to the process of treating textile fibers, textile fabrics and pile fabrics with the composition of the present invention for the purpose of imparting soil resistant properties thereto and thereafter, drying the fiber or fabric or pile fabric. Still further, this invention relates to the treated textile fiber, textile fabric, or pile fabric which is prepared in accordance with the process of the present invention.

One of the objects of the present invention is to provide a composition of matter comprising titania monohydrate having an average particle size of less than about 0.1 micron and a polymer of a compound containing a polymerizable $CH_2=C<$ group, wherein said polymer is produced by emulsion polymerization and has been washed substantially free of emulsifying agent. A further object of the present invention is the treatment of textile fibers, fabrics and the like with the composition of the present invention for the purpose of imparting soil resistant properties thereto. These and other objects of the present invention will be discussed more fully hereinbelow.

One of the components of the composition of the present invention is a titania monohydrate dispersion with substantially no particles larger than about 0.1 micron. One of the methods of preparing the titanium compound used in the composition of the present invention is fully disclosed in the copending application having the Serial No. 391,736, filed November 12, 1953, of Theodore F. Cooke and one of the present co-inventors, Elliot S. Pierce. In the preparation of this particular hydrous titania, a titanium ore is digested in the conventional manner using a strong acid such as sulfuric acid, and the digested material is hydrolyzed; then filtered in a Moore filter and is washed in order to remove sulfate ions. The washed precipitate is then reslurried and filtered again. After the second filtration, the residue is again washed, reslurried and filtered again in a Moore filter. The resultant product is generally termed "the third Moore filter cake." The filter cake thus obtained is neutralized with dilute ammonium hydroxide to a pH of about 7.0–7.2, filtered, washed cold to remove sulfate ions and filtered again. The filter cake is then triturated with concentrated hydrochloric acid until a bluish white glasslike syrup is obtained. This syrup is then diluted with a large volume of water slightly acidified with hydrochloric acid. The aqueous dispersion of titania monohydrate having a uniform particle size, averaging about 0.024 micron and a pH of 3.5 is obtained which is substantially free of flows. The particle size of the titania monohydrate to be used in the composition of the present invention should be less than 0.1 micron, and preferably for commercial operation, between about 0.02 and 0.075 micron.

Another titania monohydrate dispersion which may be used as a component of the composition of the present invention is one prepared according to the disclosure of the U. S. application, having the Serial No. 394,513, filed November 25, 1953, in the name of Richard D. Vartanian. This hydrous titania according to the Vartanian application is prepared by adding the acid peptized titania hydrate of the Cooke and Pierce application with constant stirring to a solution containing an acid such as citric acid dissolved in water. To the acidified solution, there is added an amine such as monoisopropyl amine diluted with water. When one drop of this dispersion is added to a small quantity of water, an opalescent colloidal suspension containing negatively charged titania monohydrate is obtained having a particle size less than about 0.1 micron.

An additional titania monohydrate suspension which may be used as a component of the composition of the present invention may be prepared according to the disclosure of the U. S. application having the Serial No. 409,780, filed February 11, 1954, in the name of Richard D. Vartanian. In this application, an aqueous titania hydrate slurry is neutralized, and filtered. The filter cake thus produced is washed with water so as to remove substantially all of the sulfate ions contained therein, reslurrying the washed filter cake in water and acidifying to a pH below 5 with a monobasic inorganic acid, thereafter adjusting the pH to a value greater than 5 by the addition of a mixture of ammonia and an acid such as citric, tartaric, glycolic, gluconic, lactic, acetic, oxalic, phosphoric, orthophosphoric and sulfuric. The ultimate titania hydrate particles have a size averaging about 0.02 micron.

In addition to the use of the monoisopropyl amine in the first mentioned Vartanian application, one may use any of the water soluble acyclic alkyl monoamines and water soluble acyclic alkanol monoamines and the water soluble alkyl alkanol monoamines. Representative members of this class of water soluble acyclic amines are monomethyl amine, monoethyl amine, mono n-propyl amine, monoisopropyl amine, n-butyl amine, secondary butyl amine, isobutyl amine, tertiary butyl amine, n-amyl amine, isoamyl amine, tertiary amyl amine, dimethyl amine, diethyl amine, dipropyl amine, dibutyl amine, methanol amine, ethanol amine, propanol amine, butanol amine, dimethanol amine, dibutanol amine, methyl methanol amine, methyl ethanol amine, methyl isopropanol amine, ethyl isopropanol amine, ethyl butanol amine, and the like. Obviously, these water soluble amines may be used either singly or in combination with one another. If a water soluble aliphatic acid or a polyvalent inorganic acid is used in combination with an amine in the preparation of the negatively charged hydrous titania compositions prepared according to the first mentioned Vartanian application, any water soluble amine may be used. Illustrative of the preparation of a typical titania monohydrate dispersion having the desired particle size may be prepared according to Vartanian application Serial No. 394,513 referred to hereinabove, is the example below. All weights and proportions of titania monohydrate or hydrous titania set forth herein are expressed in terms of anhydrous $TiO_2$.

*Preparation of titania monohydrate*

Into a suitable reaction vessel equipped with a stirrer, there is introduced 6000 parts of a titania hydrate slurry (third Moore filter cake, slurried with water), containing 1890 parts of titanium oxide. While continuously stirring the charge, 600 parts of iron-free water and 575 parts of a 14% ammonium hydroxide solution are added. After thoroughly stirring to a pH of about 7.2, the neutralized slurry is filtered through a Buchner funnel and washed with iron-free water until the filtrate is substantially completely free of SO₄ ions. The filter cake has a calcined solids contents of 38%. 4210 parts of the filter cake are diluted with 2190 parts of iron-free water. While stirring the dilute filter cake at a slow speed, there is added 220 parts of a concentrated hydrochloric acid (37–38% HCl). The stirring is continued for about 30 minutes after the acid addition until an opalescent milky liquid is obtained. The resulting colloidal dispersion has a $TiO_2$ content of 24.2%.

87.2 parts of the acid peptized titania hydrate suspension, thus prepared, are added with constant stirring to a solution containing 1.5 parts of citric acid dissolved in 7.5 parts of water. There is then added rapidly 3 parts of monoisopropyl amine diluted with 5.3 parts of water with a high speed stirring. After the addition is completed, the stirring is continued for 5 minutes. The resulting product is a thixotropic colloidal dispersion having a pH of 7.8. When one drop of this dispersion is added to a small quantity of water, an opalescent colloidal dispersion containing negatively charged titania monohydrate is obtained having a particle size less than 0.05 micron.

In order that the present invention may be completely understood, the following examples are set forth in which all parts are parts by weight. These examples are set forth primarily for the purpose of illustration and any specific enumeration of detail contained therein should not be interpreted as a limitation on the case except as indicated in the appended claims.

Example 1

Into a suitable reaction vessel equipped with thermometer, stirrer and reflux condenser, together with a calibrated addition tube and a gas inlet tube, there is charged 56.6 parts (20.0 parts $TiO_2$) of the titania monohydrate suspension prepared as indicated hereinabove having a particle size of 0.024 micron, 20 parts of a 40% solution of "Aerosol SE" (stearamidopropyldimethyl-hydroxyethyl ammonium chloride) and 500 parts of distilled water. The pH of the charge is approximately 2.5. Nitrogen gas is then bubbled through the suspension for about 30 minutes after which there is added 23.5 parts of acrylonitrile (wet). Nitrogen gas continues to be bubbled through the dispersion for another 30 minutes and over the surface during polymerization. In the addition tube, there is placed 0.5 parts of ammonium persulfate and 0.24 part of sodium metabisulfite dissolved in 50 parts of water. The solution of the catalyst is added dropwise over about a 2 hour period. During the addition, the temperature in the flask is maintained at about 33–35° C. To insure completeness of the polymerization reaction, the temperature is then raised to about 70° C. and maintained at that temperature for about 30 minutes. At the outset, the polymerization appeared to start shortly after the catalyst mixture was introduced and it continued smoothly to produce a white dispersion. The polymerization product thus produced is then washed on a Buchner funnel until the filtrate is neutral and the solids content of the filter cake ascertained. This product comprises equal parts on an anhydrous basis of hydrated titania and polyacrylonitrile.

In order to illustrate how the vinyl type polymer may be prepared separately from its preparation in the presence of the titania composition, the following example is set forth in which all parts are parts by weight.

Example 2

1000 parts of distilled water containing 10 parts of "Aerosol OT" (dicoctyl sodium sulfosuccinate) are placed in a suitable reaction vessel equipped with a gas inlet tube and a mechanical stirrer. Air is expelled from the container by means of nitrogen gas and the water is stirred with 55.7 parts of steam distilled acrylonitrile (containing 3.5% water) are added. The acrylonitrile dispersion is stirred rapidly and the temperature maintained at about 26° C. during the slow addition of a catalyst solution containing 2 parts of potassium persudfate and 0.77 part of sodium bisulfite in 9 parts of water. The polymerization starts immediately but the reaction is not strongly exothermic. The temperature of the reaction mixture is maintained at 32° C. for about 45 minutes and then raised to about 34° C. After about 4 hours, the polymer reaction product is coagulated, filtered, and washed under suction and the solids content of the filter cake is determined.

Example 3

A colloidal suspension of the product produced according to Example 1 is prepared in an aqueous dispersion containing about 1% solids expressed as weight based on the total weight of the suspension. This aqueous dispersion is applied to a white 5" x 5" carpet sample having an all-wool pile by immersing the pile into the dispersion. The wet pick-up is 100% by weight based on the weight of the pile. The carpet is then dried in a stream of hot air until substantially completely dry. There is no indication of any white precipitate on the pile fabric as a result of this treatment. The treated piece and an untreated control are fastened to two 4" x 4" windows in a revolving drum for the purpose of exposing the treated and control pieces to soil. Two grams of a synthetic soil is introduced into the drum. The opening in the drum is then closed and the drum is rotated for about 20 minutes. The samples of the carpet material are then removed, vacuum cleaned and the treated sample is compared with the control in order to evaluate the effectiveness of the treatment for imparting soil resistance to the treated sample. The treated carpet after the vacuum cleaning, is light gray in color whereas the untreated carpet is practically all black, even after the vacuum cleaning.

Example 4

The procedure of Example 3 is repeated using a carpet containing an all cellulosic pile and the results were essentially the same as those obtained on the woolen pile fabric of Example 3. A treating bath containing about 1% solids comprising a mixture of titania monohydrate having a particle size of about 0.024 micron and polyacrylonitrile prepared according to Example 2 are physically mixed in a ratio of 1 part of hydrated titania to 2 parts of the polyacrylonitrile on an anhydrous basis. Two samples of carpeting were treated again with this mixture according to the procedure outlined in Example 3 and again the untreated control is black whereas the treated material after vacuum cleaning is light gray.

Example 5

A treating bath is prepared containing 1% solids by weight of a mixture of 1 part of hydrated titania on an anhydrous basis prepared as indicated hereinabove with two parts of the polyacrylonitrile prepared according to Example 2 and a piece of 5" x 5" white carpet sample having an all wool pile is treated with the bath to a wet pick-up of 100% by weight based on the weight of the pile. The carpet is then dried in a stream of hot air unail dry. The treated piece and an untreated control are tested for soil resistant properties substantially as in Example 3. The untreated control, after vacuum cleaning is black whereas the treated piece, after vacuum cleaning, is light gray.

Example 6

Example 5 is repeated using a mixture in which the ratio of hydrated titania calculated as anhydrous $TiO_2$ to polyacrylonitrile is 2:1, respectively, and the amount of total solids of titania monohydrate and polyacrylonitrile present in the treating bath is about 1%. The procedure of treating a pile carpet according to Example 3 is repeated and after vacuum cleaning the treated piece had a light gray color, whereas after vacuum cleaning the untreated control was black.

Example 7

A piece of pile carpet is treated with a 1% solids dispersion of the product produced according to Example 1. The pile fabric thus treated together with an untreated control is subjected to the soil treatment according to the drum method of Example 3. After vacuuming the treated and untreated pieces, the treated piece was gray, whereas the untreated control was black. When the treated piece is washed and dried, it was light gray in color whereas the untreated control, after washing, was still practically black.

Example 8

A copolymer of acrylonitrile and acrylamido-propyl-benzyl-dimethyl ammonium chloride is prepared from equimolar proportions of the monomers in the presence of an equal amount of titania monohydrate on an anhydrous basis using ammonium persulfate as a catalyst and "Aerosol SE" (40% solution) as the emulsifying agent in an emulsion polymerization reaction.

Example 9

A copolymer of vinyl acetate and acrylonitrile is prepared in which the monomers are present in equimolar proportions in the presence of an equal amount by weight of titania monohydrate on an anhydrous basis as prepared hereinabove in an emulsion polymerization reaction using ammonium persulfate as the catalyst and "Aerosol SE" as the emulsifying agent.

Example 10

A polymer of methacrylic acid is prepared using hydrogen peroxide as a catalyst in an emulsion polymerization reaction in which the emulsifying agent is "Aerosol SE." The polymerization is carried out in the presence of an equal amount by weight of the titania monohydrate on an anhydrous basis as prepared hereinabove.

Example 11

A polymer of methyl methacrylate is prepared in an emulsion polymerization reaction using hydrogen peroxide as the catalyst and using "Aerosol OT" (dioctyl sodium sulfosuccinate) as the emulsifying agent. This polymerization was carried out in the presence of the titania monohydrate.

Example 12

A copolymer of maleic anhydride and vinyl acetate is prepared in an emulsion polymerization using benzoyl peroxide as the catalyst and "Aerosol AY" (diamyl sodium sulfosuccinate) as the emulsifying agent. The maleic anhydride and vinyl acetate are present initially in equimolar proportions. The polymerization is carried out in the presence of hydrous titania having a particle size of 0.024 micron and in which the total amount of polymer formed is calculated to be substantially equal to the total amount of titania monohydrate present on an anhydrous basis.

Example 13

Methylene bis-acrylamide is polymerized in the presence of titania monohydrate having a particle size of 0.024 micron using ammonium persulfate as the catalyst in an emulsion polymerization reaction using diisobutyl sodium sulfosuccinate as the emulsifying agent.

Each of the polymers prepared according to the Examples 8–13, inclusive, are separately coagulated wherever necessary, filtered and washed to remove substantially all of the emulsifying agent and the coagulating agent, if used.

Example 14

A 1% suspension of each of the compositions prepared according to the Examples 8–13, inclusive, are separately prepared and the mixtures are separately applied to a carpet material containing a cellulosic pile to give a wet pick-up of 100% by weight based on the weight of the pile. After drying and testing for soil resistance in a manner substantially identical with that outlined in detail in Example 3, it was observed in each instance that the untreated material was black while the treated materials were light gray.

Example 15

A physical mixture is made using equal parts by weight on an anhydrous basis of the monohydrated titania prepared according to the example set forth hereinabove with a polyvinyl acetate prepared in an emulsion polymerization reaction. A second physical mixture is made using the same parts by weight of the hydrated titania prepared according to the example set forth hereinabove with a polyacrylamide polymerized in an emulsion polymerization reaction. A physical mixture is made using the same parts by weight of the hydrated titania and a separately prepared copolymer of equal parts of vinyl chloride and vinylidene chloride. Each of these mixtures was separately diluted to a solids concentration of 1% by weight based on the total weight of the dispersion and the mixtures were separately applied to white 5" x 5" carpet samples having an all wool pile in the method outlined in Example 3. The samples are then tested for their soil resistant properties by the method outlined in Example 3 with the following results. After vacuum cleaning, the untreated control was black, the sample treated with the polyvinyl acetate-hydrated titania composition was very light gray; the sample treated with the polyacrylamide-hydrated titania was gray, the sample treated with the copolymer of vinyl chloride and vinyl chloride together with the hydrated titania was light gray.

In the preparation of the composition of the present invention, it is possible to polymerize the vinyl compound in an emulsion polymerization reaction separately from the titania hydrate dispersion and thereafter physically mix the vinyl polymer prepared with the titania hydrate composition or one may polymerize the vinyl compound in an emulsion polymerization reaction in the presence of the titania hydrate. As a third possibility, one may partially polymerize the polymerizable compound containing the $CH_2=C<$ group in the absence of the titania hydrate and complete the polymerization by means of an emulsion polymerization reaction in the presence of the titania hydrate sol. Amongst the compounds containing the polymerizable group $CH_2=C<$ group which may be used in the emulsion polymerization of the polymers useful as a component in the concept of the present invention are acrylonitrile, methacrylonitrile, ethacrylonitrile, chloroacrylonitrile, styrene, alpha methyl styrene, alpha ethyl styrene, alpha halo styrenes such as alpha chloro styrene, alpha iodo styrene, alpha bromo styrene, alpha fluoro styrene, the ortho, meta or para alkyl styrenes such as the ortho methyl styrene, meta ethyl styrene, para propyl styrene, the ortho, meta or para halo styrenes such as the ortho chloro styrene, meta bromo styrene, para iodo styrene, or the disubstituted alkyl styrenes such as 2,4-dimethyl styrene, 2,5-diethyl styrene, 3,5-dipropyl styrene, 2,5-dimethyl styrene, or vinyl chloride, vinylidene chloride, vinyl acetate, vinyl propionate, acrylic acid, the alkyl esters of acrylic acid, for instance, methyl acrylate, ethyl acrylate, propyl acrylate or the alkyl esters of the methacrylic acid such as methyl methacrylate, ethyl methacrylate, butyl methacrylate, or the alkyl esters of the ethacrylic acids such as methyl ethacrylate, ethyl ethacrylate, propyl ethacrylate, butyl ethacrylate, or the vinyl pyridines, such as N-vinyl pyridine, the acrylamides, such as acrylamide per se or methacrylamide, N-methylol acrylamide and the like. These polymerizable monomers containing the polymerizable $CH_2=C<$ group may be used either singly or in combination with one another. These emulsion polymerization reactions may be carried out by use of an emulsifying agent such as those disclosed in the U. S. Patent 2,028,091 or U. S. Patent 2,589,674. In the preparation of the polymer by the emulsion polymerization reaction, it is generally conventional to make use of a catalytic material in catalytic amounts. Redox catalyst systems may be used, as is conventional, wherein said catalysts contain an oxidizing and a reducing agent.

Regardless of which method is selected for the preparation of the compositions of the present invention, namely the separate polymerization followed by the physical admixture with the titania hydrate or the polymerization of the monomer in situ with the titania hydrate or the partial polymerization in the absence of the titania hydrate followed by the completion of the polymerization in the presence of the titania hydrate, it is necessary to break the latex formed in order to filter the material. If the product produced is not filterable, then it is necessary to add a material to break the latex in order to render the composition filterable. It is necessary to render the composition filterable in order to permit the washing of the residue in order to remove the emulsifying agent and in order to remove the coagulating agent, if any is present. After the precipitate has been thoroughly washed, as indicated hereinabove, it may be reslurried in water and rediluted to a concentration of about 1 to 2% by weight based on the total weight of the dispersion. In the instance where the polymerization reaction is carried out independently of the titania hydrate, the steps leading up to the removal of the emulsifying agent and coagulating agent, if any, can be carried out before the physical admixture with the titania hydrate is accomplished. In this latter event, the polymer is formed, the latex broken if necessary, the material thus prepared filtered, washed, reslurried and physically admixed with the titania hydrate composition. The composition thus prepared is then ready for use in treating the fibers and/or the fabrics in order to impart soil resistant properties thereto.

The fibers or fabrics produced therefrom may be either natural or synthetic fibers. Amongst the natural fibers which may be treated in accordance with the concept of the present invention are wool, silk, cotton, linen and cellulosic fibers and the like. Amongst the synthetic fibers which may be treated in keeping with the concept of the present invention are those derived from linear super polyamides, linear polyesters, polyacrylonitrile and the like and fabrics containing these fibers and mixtures thereof.

The treating suspension may be applied to the fibrous materials by any one of a plurality of conventional treating methods such as by immersion, spraying, or passing the fabric in contact with a quetch-roll, which travels in the treating suspension up to and onto the fabric. So called flat fabrics or woven carpets (which do not contain a pile) may be immersed in the solution and then passed through a wringer to give about 100% wet pick-up by weight based on the weight of the fabric. Pile fabrics, on the other hand, may be passed over a roll with the pile down in such a manner that the pile is just close enough to the surface of the suspension so that the pile is wetted without contacting the adhesive binding on the back of the fabric. Such a bath may be maintained at the desired height by utilizing an overflow pipe. Regardless of the manner in which the dispersion is applied to the fabric, the treated fabric is always dried by some conventional means such as by passing the treated fabric over stenters or through hot flues or in loop driers. Pile fabrics should be dried on conventional equipment designed for this purpose in order that the pile remains upright and is not damaged by the aqueous treatment.

In the practice of the process of the present invention, the drying of the impregnated fibers or fabrics can be done at temperatures between about 80 and 115° C. Lower temperatures may be used but they would necessitate lengthening the drying time and, as a consequence, should be avoided. Temperatures higher than 115° C. may also be used but care must be exercised at the higher temperatures to avoid damaging the fabrics or fibers and since the drying can be accomplished at temperatures below 115° C. such higher temperatures are deemed unnecessary. The drying time will depend upon the temperature selected as well as the relative humidity of the air used for drying. Obviously, with the lower temperatures and higher humidities, the time will be considerably longer than when higher temperature humidities are used. The important thing to be observed is that the drying be continued until the treated fabric is dry to touch. Those skilled in the art will readily be able to adjust their drying times and the temperatures in order to produce a dried fabric. The drying time, then, may vary between about 5 minutes and 60 minutes, depending upon the other relating conditions. Overdrying to any significant extent is preferably avoided.

The total amount of solids of the compositions in the present invention which may be utilized in the form of aqueous dispersions in the treatment of textile fibers and fabrics will cover a rather wide range such as between about 0.1 and 5% by weight, based on the total weight of the aqueous dispersion. It is preferred, however, that the concentration of solids in the dispersion be between about 0.5 and 1.5% by weight. For optimum operability and results, the concentration is generally held at about 1% solids by weight.

In addition to imparting soil resistance to the treated fibers and fabrics, the process of the present invention also imparts slip resistance to the fibers and also produces fibers which are free of the defect of whitening, particularly when the treatment is applied to black dyed fabrics or those dyed dark shades.

In the preparation of the polymeric material, it may become necessary to "break" the latex in order to filter the same and to wash the precipitate free of the emulsifying agent. This can be accomplished by a number of conventional methods such as by freezing or by the addition of an electrolytic material. If the latter approach is used, one may utilize as the "latex breaking" agent or coagulating agent alum, sodium chloride, hydrochloric acid, sulfuric acid, nitric acid, phosphoric acid and the like. In using these electrolytic materials for the purpose of breaking emulsions, the ultimate filtered polymer must be washed sufficiently so as to remove not only the emulsifying agent but also to remove the electrolyte from the filtered material. When freezing is used, only the emulsifying agent need be removed.

We claim:

1. A composition of matter which comprises titania monohydrate particles, peptized in the substantial absence of sulfate ions at an original pH below about 5 in an aqueous solution of a monobasic inorganic acid, in a stable aqueous colloidal dispersion with substantially none of said particles larger than about 0.1 micron, which dispersion is substantially free of emulsifying agents and contains a polymer produced by the emulsion polymerization of a compound containing a $CH_2=C<$ group, wherein the $TiO_2$:polymer weight ratio is between about 1:4 and about 4:1.

2. A composition of matter according to claim 1 wherein the $TiO_2$:polymer weight ratio is between about 1:2 and about 2:1.

3. A composition of matter according to claim 1 in which the $TiO_2$:polymer weight ratio is substantially 1:1.

4. A composition of matter according to claim 1 which comprises polyacrylonitrile.

5. A composition according to claim 1 in which the polymer comprises polyacrylonitrile and the $TiO_2$:polyacrylonitrile weight ratio is between about 1:2 and about 2:1.

6. A process for imparting soil-retardant properties to textile fibers which comprises treating the fibers with a composition according to claim 1 and thereafter drying the fibers.

7. A process for imparting soil-retardant properties to textile fabrics which comprises treating a textile fabric with a composition according to claim 1 and thereafter drying the fabric.

8. A process for imparting soil-retardant properties to pile fabrics which comprises treating a pile fabric with a composition according to claim 1 and thereafter drying the pile fabric.

9. A process for imparting soil-retardant properties to pile fabrics which comprises treating a pile fabric with a composition according to claim 1 having a solids content between about 0.1 and about 5% by weight and containing sufficient polyacrylonitrile to provide a $TiO_2$:polyacrylonitrile ratio between about 1:2 and about 2:1, and thereafter drying the pile fabric.

10. A soil-resistant textile fabric treated with a composition according to claim 1 and thereafter dried.

11. A soil-resistant textile fabric treated with a composition according to claim 1 of solids content between about 0.1 and about 5.0% by weight wherein the $TiO_2$:polymer ratio is between about 1:2 and about 2:1 and thereafter dried.

12. A soil-resistant pile fabric treated with a composition according to claim 1 wherein the $TiO_2$:polymer ratio is between about 1:2 and 2:1.

13. A soil-resistant pile fabric treated with a composition according to claim 1 having a solids content between about 0.1 and about 5% by weight and containing sufficient polyacrylonitrile to provide a $TiO_2$:polyacrylonitrile ratio between about 1:2 and about 2:1, and thereafter dried.

References Cited in the file of this patent
UNITED STATES PATENTS

| | | |
|---|---|---|
| 1,999,182 | Dreyfus et al. | Apr. 30, 1935 |
| 2,035,504 | Parkinson et al. | Mar. 31, 1936 |
| 2,462,354 | Brubaker et al. | Feb. 22, 1949 |
| 2,473,929 | Wilson | June 21, 1949 |
| 2,549,940 | Signaigo | Apr. 24, 1951 |
| 2,622,307 | Cogovan et al. | Dec. 23, 1952 |